United States Patent [19]

Marks et al.

[11] 4,421,806

[45] Dec. 20, 1983

[54] LOW DENSITY RESIN SYSTEMS FOR IMPROVED FILAMENT-WOUND COMPOSITES USEFUL AS ROCKET MOTOR CASES

[75] Inventors: Burton S. Marks, Palo Alto; Richard E. Mauri, Mt. View; Gazel W. Watsey, Livermore, all of Calif.

[73] Assignee: Lockheed Missiles & Space Company, Inc., Sunnyvale, Calif.

[21] Appl. No.: 292,648

[22] Filed: Aug. 13, 1981

[51] Int. Cl.³ .......................... B32B 1/08; B64G 1/20; F02K 9/00
[52] U.S. Cl. .................................... 428/36; 60/200.1; 138/144; 138/174; 138/177; 156/162; 156/173; 156/175; 242/7.21; 244/158 R; 244/172; 428/294; 428/366; 428/367; 428/395; 428/475.8; 428/521; 526/340; 528/393
[58] Field of Search ....................... 138/144, 174, 177; 156/162, 173, 175; 242/7.21; 428/36, 294, 366, 367, 395, 475.8, 521; 60/200 R; 244/158 R, 172

[56] References Cited

U.S. PATENT DOCUMENTS

| | | |
|---|---|---|
| 3,062,242 | 11/1962 | Vanderbilt . |
| 3,515,772 | 6/1970 | Lubowitz et al. . |
| 3,528,878 | 9/1970 | Lubowitz et al. . |
| 3,616,193 | 10/1971 | Lubowitz et al. . |
| 3,673,274 | 6/1972 | Tomalia et al. . |
| 3,759,777 | 9/1973 | Lubowitz et al. . |
| 3,853,815 | 10/1974 | Lubowitz . |
| 3,931,354 | 1/1976 | Sheppard et al. . |
| 3,970,495 | 7/1976 | Ashton et al. .......................... 428/36 |
| 4,016,022 | 4/1977 | Browning et al. . |
| 4,039,006 | 8/1977 | Inoue et al. ............................ 428/36 |

Primary Examiner—James C. Cannon
Attorney, Agent, or Firm—Richard H. Bryer

[57] ABSTRACT

Filament-wound composite bodies are disclosed. These bodies contain filament-wound fibers and resin. The resin, when cured, has a density of less than 1.05 g/cc and exhibits a water pick up of less than 1% by weight. When uncured, the resin contains an aromatic vinyl hydrocarbon monomer and as its major component poly(1,2-butadiene), carboxy-terminated poly(1,2-butadiene) or mixtures thereof and has a viscosity of less than 2000 cps at 45° C. These filament-wound bodies advantageously are embodied as rocket motor cases.

49 Claims, No Drawings

LOW DENSITY RESIN SYSTEMS FOR IMPROVED FILAMENT-WOUND COMPOSITES USEFUL AS ROCKET MOTOR CASES

BACKGROUND OF THE INVENTION

1. Field of the Invention

This invention relates to filament-wound fiber-resin composites having advanced structural properties and uncured resin mixtures used in their production.

2. Prior Art and Statement of Needs

Solid propellant rocket motor cases for missile systems, spacecraft boosters, and other types of large and small high-performance, lightweight pressure vessels are presently made from fiber reinforcement and various formulations of polyepoxide (epoxy) resins by the filament winding process. Similarly, filament winding with both polyesters and epoxy resins has made possible production of lightweight tanks, poles and piping. Historically, fiberglass has been the most common reinforcement fiber but other fibers such as carbon (graphite) filaments, boron filaments, and high modulus organic polymer filaments, most significantly aramid filaments, have been increasingly employed to take advantage of their differing physical properties.

The resins utilized are typically epoxy formulations based on diglycidyl ether bis-phenol A (DGEBA), reactive low-molecular weight epoxy diluents and curing agents consisting of aliphatic and aromatic amines and carboxylic acid anhydrides. Both flexibilized and rigid epoxy resins have been successfully used as matrices for the filament-wound composite structures.

The epoxy-based resins have not been without their disadvantages in this application. They tend to be somewhat high in density. For example, densities of 1.2 to 1.3 g/cc are often seen. Also, they generally require relatively high proportions of resin, say 35+% by weight, in the final composite. Composites based on epoxy resins are somewhat polar and hydrophilic and thus, with time, pick up weight via absorption of moisture from the atmosphere. These three problems can be deleterious in aerospace applications where low weight is a most sought after property. In addition, when epoxy-based resins are used with high modulus organic fibers, such as the aramid fibers, there is often enhanced crack propagation due to weakness in the fiber's radial dimension and thus strength reduction. Classically this strength reduction is corrected by precoating the fibers with substantial amounts of low viscosity lubricating or release agents. This prevents a too tight bond between the epoxy and fiber and distributes loads more evenly through the aramid fiber windings. This solution has a concurrent problem as the additional release agent adds weight to the composite.

A need exists for an improved resin-fiber composite which is of low density and low water pick-up and that, through proper fiber-resin interactions, gives high strength. The desired resin system should have physical and chemical properties in its uncured state, such as low viscosity and good pot life, that are conducive to successful use in production scale filament winding.

It is an object of this invention to provide resins and resin-fiber composites that meet these needs.

STATEMENT OF THE INVENTION

A new filament-wound fiber-resin composite has now been found. It is a cured fiber-resin composite containing not less than 65% by weight of filament-wound fibers and not more than 35% by weight of resin. The resin has a cured density of less than 1.05 g/cc, and has a saturation water pick-up at ambient temperature and 95% relative humidity of less than 1% by weight. In its uncured state the resin is an essentially solvent-free liquid having a viscosity of less than 2000 cps that includes aromatic vinyl hydrocarbon monomer and, as its major component, poly(1,2-butadiene), carboxy-terminated poly(1,2-butadiene), or mixtures thereof. In some embodiments it may contain minor amounts of epoxy resin. The resin-fiber combination may be formed as preimpregnated roving or tape and stored on spools, if desired, for later use in filament winding fabrication techniques or may be formed during the filament winding process as is known in the art. The filament-wound composites of this invention may take on a variety of finished product forms including, as a preferred product form, rocket motor casings.

DETAILED DESCRIPTION OF THE INVENTION

Definitions and General Matters

"Filament winding" shall mean the known process for fabricating fiber-resin composites and structures made therefrom as is described in *The Encyclopedia of Polymer Science and Technology*, 1970, Volume 6 which description is incorporated by reference.

"Major fraction" shall mean an amount greater than half of the total, by weight.

Molecular weights for polymers or degree of polymerization, when given are based either on osmotic determinations or on gel permeation chromatography comparison of test materials with relevant standards of known size. These values will be expressed as D.P. values for degree of polymerization or Daltons (D) for molecular weight.

Viscosities are expressed in centipoises with the temperature of measurement being 45° C. unless otherwise noted.

Temperature, pressure and mass are expressed in centigrade and metric units unless otherwise noted.

Percentages are weight percentages unless otherwise noted.

The filament-wound composites of this invention comprise a filament-wound fiber reinforcement and an organic polymer resin.

The Fiber Reinforcement

The fiber reinforcement is selected from one or more of glass fibers, boron filaments, graphite (carbon) filaments and high modulus organic filaments, particularly organic filaments of aramid and the like all of which are themselves known in the art. Examples of high modulus organic filaments are the poly(benzothiazoles) and the poly(aromatic amides) that are commonly referred to as aramids. Aramids include poly(benzamides) and the family of materials marketed by I. E. duPont under the registered trademark KEVLAR. A preferred fiber reinforcement is the aramid marketed as KEVLAR® 49. These fibers may be treated or untreated as is known in the art.

The Polymer Resin

The resin employed is a mixture of organic components. The individual components are generally not limited to specific materials but instead are selected according to the guidelines presented herein such that the final resin mixture and cured product both meet certain specified requirements.

In general terms, the resins employed are characterized by containing, in their uncured state, vinyl monomer and a major fraction of poly(1,2-butadiene), carboxy-terminated poly(1,2-butadiene) or mixtures thereof. The resins additionally contain one or more curing agents—usually including a free-radical curing agent. When the resins contain carboxy-terminated poly(1,2-butadiene) they also may contain minor amounts of epoxy-group-containing materials. In such cases, an epoxy accelerator may be added. Flexibilizing monomers may also be advantageously copolymerized into the resin, in some cases.

Poly(1,2-butadiene)

The poly(butadiene) employed must be the "1,2" isomer. Commercially available "1,2" material may be used. Such poly(1,2-butadiene) is generally not absolutely isomerically pure, rather it is at least about 80% 1,2-isomer and preferably is at least about 85% 1,2-isomer. In its precure state, this component is a liquid, low molecular weight polymer having a degree of polymerization (DP) of 15 to 100—preferably 20 to 60 and more preferably 20 to 50. Such DPs reflect molecular weight of from about 800 to about 5400, preferably 1000 to 3300 and more preferably about 1000 to about 2700 D. These materials exhibit viscosities of from about 500-1000 cps (at 45° C.) at the low end of these ranges and viscosities of greater than 100,000 cps at the higher end of these ranges.

The following readily available poly(1,2-butadienes) are marketed by Nippon Soda Co., Ltd., and may be used separately or as mixtures:

B-1000—>85% 1,2 isomer—average molecular weight 1150±160 D.
B-2000—>85% 1,2 isomer—average molecular weight about 2000±200 D.
B-3000—>90% 1,2 isomer—average molecular weight about 3000±300 D.

It should be noted that the B-1000 material has a suitably low viscosity while the B-2000 material is somewhat too viscous and the B-3000 material (or equivalent) is substantially more viscous than the desired viscosity for the formulated resin. Thus, these materials must have their viscosities reduced by proper selection of admixed vinyl monomers. B-1000, B-2000 and their equivalents and mixtures thereof are preferred.

Carboxy-terminated Poly(1,2-butadiene)

The carboxy-terminated poly(1,2-butadiene) component is a poly(butadiene) having a proper molecular size and 80% or greater 1,2 isomer purity, and preferably 85% or greater 1,2 isomer purity as described above that has been modified by coupling —COOH groups or COOH-containing groups to both of its ends. The ideal 2.0 COOH groups per molecule is rarely achieved. Materials with on average 1.6–1.8 COOHs per molecule work well and are available such as the material marketed as "C1000" by Nippon Soda Co., Ltd. This material has an average molecular weight of 1400±200 and a viscosity of 10,000–25,000 cps at 45° C. Additionally, carboxyl groups may be introduced into poly(1,2-butadiene), for example, by starting with hydroxy-terminated poly(1,2-butadiene) and using the hydroxies as reactive sites for attaching carboxyl-bearing groups. One such reaction involves reacting the OHs with anhydrides of dicarboxylic acids, for example cyclic monomeric anhydrides such as maleic anhydride. This yields a carboxyl group containing end group, such as

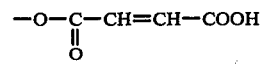

Other art-known techniques may be used. These include reacting an OH-terminated poly(1,2-butadiene) with an aromatic diisocyanate such as

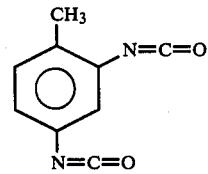

and thereafter adding glycolic acid (HOCH$_2$COOH) to yield a urethane linkage and give desired terminal COOH groups.

Aromatic Vinyl Hydrocarbon Monomer

The resins additionally contain minor amounts, such as from about 3% up to about 45%, preferably from 5% to 35% and more preferably from 5% to 30% of an aromatic vinyl hydrocarbon monomer, or a mixture of such vinyl monomers.

These aromatic vinyl hydrocarbon compounds may be selected from the compounds given in Table 1 and their equivalents.

TABLE I

Aromatic Vinyl Hydrocarbon Monomers

1. Styrene
2. Vinyl Toluenes—o,m, & p Derivatives
3. o,m & p—Ethyl Styrene
4. o & p—Isopropyl Styrene
5. 2,4-Diisopropyl Styrene
6. 2,5-Diisopropyl Styrene
7. 2,4-Dimethyl Styrene
8. 3,4-Dimethyl Styrene
9. Vinyl Mesitylene
10. Vinyl Durene
11. t-Butyl Styrene (tBS)
12. Divinyl Benzene There is, however, a special preference for the aromatic vinyl hydrocarbons of a styrene structure and, more particularly, styrene and styrene substituted with 1 or 2 alkyls or alkenyls independently selected as having from 1 to 5 carbons each, such a vinyl toluene, 2,4- or 2,5-diisopropyl styrene, divinyl benzene, t-butyl styrene and the like. These materials improve the physical properties of the liquid resin such as by lowering its viscosity into the desired less-than-2000 cps range, if required, and unlike added solvent, need not be removed as they are incorporated into the final cured resin. They do not lead to unacceptably high water pick ups and yield a low density cured resin product. t-Butyl styrene and mixtures containing primarily t-butyl styrene are most preferred vinyl compounds for most formulations.

Divinyl benzene, if employed, should be used in admixture with other aromatic vinyls so as to avoid undue embrittlement of the cured resin. Preferably divinyl benzene makes up no more than ⅓ of the total aromatic vinyl hydrocarbon.

Flexibilizing Monomer

It is also within the scope of this invention to add minor amounts of vinyl group-containing monomers which can improve the flexibility and reduce brittleness in the cured resin. These materials include the glycol dimethacrylates and acrylates including the materials listed in Table II.

TABLE II

Flexibilizing Monomers

1. Butylene Glycol Diacrylates
2. Diethylene Glycol Diacrylates
3. Triethylene Glycol Dimethacrylates
4. Tetraethylene Glycol Dimethacrylates Also acrylate analogs of the above.

These materials are advantageously present at levels of 3% to 10% when sustantial amounts such as 20% to 30% of a vinyl aromatic and primarily poly(1,2-butadiene) are present in the final formulation, especially when the fraction of poly(1,2-butadiene) plus styrene type monomer exceeds 80% of the total resin composition.

Epoxy Containing Material

Although the resins employed herein are not *primarily* epoxy resin materials, they can contain minor amounts such as up to 30% by weight total of one or more epoxy compounds. It is particularly advantageous to employ an approximately stoichiometric equivalence of epoxy groups to the COOH content of the carboxy-terminated poly (butadiene). That is, the number of moles of carboxy groups in the carboxy-terminated poly(1,2-butadiene) and the number of moles of epoxy should be about equal, which means a ratio of about 1:1, preferably not further apart than 3:2 to 2:3 and more preferably, from 10:9 to 9:10.

Close conformance with the about 1:1 (i.e. 9:10 to 10:9) ratio is particularly important when the epoxy-containing materials has two epoxy groups or is bifunctional and reaction of the two epoxy groups with the carboxy groups is needed to permit chain extension and growth. If the epoxy-containing material has more than two epoxy groups such as three then it it still preferable to have equivalent epoxy:carboxyl stoichiometry but it is not critical. One would still get chain extension and growth with a three epoxy group material with a stoichiometry as low as 3:2 for epoxy:carboxy. Polyepoxy materials containing more than three epoxy groups would be treated in a similar fashion so as to guarantee chain growth. Generally it is preferred to have a 1:1 epoxy:carboxy stoichiometry.

The epoxy compounds employed include di-, tri- and poly-epoxides selected from aromatic and cycloaliphatic epoxides as well as specialized structures such as hydantoins, novolacs, etc. Examples of useful epoxy components include the materials listed in Table III.

TABLE III

Examples of Epoxy Chemical Compounds 1,4-Butanediol Diglycidyl Ether
Vinylcyclohexane Dioxide
3,4-Epoxycyclohexylmethyl-3,4-Epoxycyclohexane Carboxylates
Resorcinol Diglycidyl Ether
Bis (3,4-epoxy-6-methylcyclohexylmethyl) Adipate
Diglycidyl Ether-Bisphenol-A
Triglycidyl Ether of Trimethylolpropane
Triglycidyl Ether of Glycerine
Diglycidyl Ester of Linoleic Dimer Acid
Polyallylglycidyl Ether
Triglycidyl-p-Aminophenol
Diglycidyl Hydantoin
Epoxy Novolac
Diglycidyl Ether of Methylene-Bis-Cyclohexanol Mixtures of epoxides may be employed as well.

Curing Agents

The resins of the invention contain "an effective curing amount" of curing agent. This amount is defined to be an amount that will produce a cured product in a thermal cure sequence typically employed in filament winding processing. Generally this is in the range of 1% to 10% by weight of agent based on the finished resin. The curing agents include free-radical generating materials, especially organic peroxides. Such materials are well known in the art and can include high temperature materials as well as materials active at lower temperatures. Examples of useful peroxides are given in Table IV.

TABLE IV

FREE RADICAL CATALYSTS

| Type | Examples | 10 hr. t½ (°C.) |
|---|---|---|
| Lower Temperature Free Radical Catalysts | | |
| A. Diacylperoxide | (1) Dibenzoyl peroxide (may be in paste forms including a plasticizer) | 73° C. |
|  | (2) Dilauroyl peroxide | 64° C. |
| B. Peroxyesters | (3) t-butyl peroxy-2-ethylhexanoate | 73° C. |
|  | (4) t-amyl peroctoate | 70° C. |
| Higher Temperature Free Radical Catalysts | | |
| A. Peroxyesters | (5) t-butyl perbenzoate | 105° C. |
|  | (6) 2,5-Dimethyl 2,5-bis (benzoylperoxy) hexane | 100° C. |
| B. Alkylperoxides | (7) Dicumyl peroxide (Dicup) | 115° C. |
|  | (8) Di t-butyl peroxide | 126° C. |
| Other Useful Peroxides | | |
| A. Hydroperoxides | (9) 1,1,3,3-Tetramethyl Butyl Hydroperoxide | 131° C. |
|  | (10) t-Butyl Hydroperoxide-70 | 119° C. |
| B. Ketone Peroxides | (11) 2,4-Pentanedione Peroxide | 130° C. |
|  | (12) Methyl Ethyl Ketone Peroxide | 105° C. |
| C. Tertiary Alkyl Perketals | (13) Ethyl 3,3-Bis (t-Butylperoxy) Butyrate | 110° C. |
|  | (14) Cyclic Peroxy Ketals (USP 130) | 130° C. |
|  | (15) Cyclic Peroxy Ketals (USP 138) | 138° C. |

Epoxy Accelerators

When epoxy and carboxy-terminated poly(1,2-butadiene) are present, it may be of advantage to incorporate minor amounts such as from 0.05 to 1.0% of an accelerator for the reaction of the epoxy and carboxy groups. These materials are known in the art to include materials such as chromium salts of carboxylic acids, for example chromium octoate; tin salts of carboxylic acids such as tin octoate, tin decanoate or the like.

A preferred accelerator is AMC®—2, Cordova Chemical, Muskegon, MI which is a chromium salt of organic carboxylic acids and includes chromium octoate.

It should be borne in mind that these accelerators often will slowly advance or cure the resin. Accordingly, they should be added immediately before use.

It must be noted that one does not depart from the spirit of the invention by adding minor amounts of other monomers to the resin mix so long as these additions so not materially adversely change the resin properties or the properties of the composite. For example, one could add up to 5 or 10% by weight (so long as it is not more than about 25% of the vinyl aromatic content) of the materials in Table V or their equivalents without departing from the invention. In general, it is not preferred to make such additions.

TABLE V

Methacrylates

1. Methyl Methacrylate
2. Phenyl Methacrylate
3. 3,3-Dimethyl-2-Butyl Methacrylate

Polymethacrylates

1. Trimethylolpropane Triacrylate & Trimethacrylate
2. Pentaerythritol Tetramethacrylate & Tetraacrylate
3. Glyceryl Triacrylate

Phenolic Dimethacrylates

1. Bisphenol "A" Dimethacrylate (solid)
2. Hydroquinone Dimethacrylate

Di & Poly Allylics

1. Diallyl Phthalates
2. Diethyleneglycol-bis-allyl Carbonate
3. Triallyl Cyanurate (Solid)
4. Diallyl Sebacate

Miscellaneous

1. Hexamethylene-bis-acrylamide
2. N,N-Diallylmethacrylamide
3. N,N-Diallylacrylamide

The Resin Formulations

The above-described materials are admixed or formulated into resin mixtures. As has been noted, the primary or major component is 1,2-butadiene, carboxy-terminated 1,2-butadiene or mixtures thereof. In general terms, the resins must comprise at least one of these two components, plus vinyl monomer plus a curing agent. The selection of one of the three possible combinations of the two 1,2-butadiene components will define a "family" of preferred compositions.

When poly(1,2-butadiene) alone is the major component, the resin will preferably have the following composition by weight:

50–90% by weight poly(1,2-butadiene);
9–45% vinyl monomer;
1–10% free radical-generating curing agent.

More preferably resins of this family will additionally contain 1 to 10% of copolymerizable flexibilizing monomer. Even more preferably they will be formulated to contain:

60–80% poly(1,2-butadiene), 85% pure 1,2 configuration;
20–35% styrene or styrene derivative;
3–10% flexibilizing monomer;
1–5% organic peroxide curing agent.

A most preferred embodiment of the family consists essentially of:

63–68% poly(1,2-butadiene), 85% pure, especially as an about 2:3 weight mixture of B-1000 and B-2000 or equivalent
26–30% t-butyl styrene
4–6% tetraethyleneglycol dimethacrylate
2–4% dicumyl peroxide
0.75–1.25% dibenzoyl peroxide Such a resin forms excellent filament wound composites containing from 70 to 80% by weight aramid fibers—and higher weight percents can be expected with higher density fibers.

When the resins contain a mixture of poly(1,2-butadiene) and carboxy-terminated poly(1,2-butadiene) these two components may comprise from 50% to 90% of the total resin weight. Generally these two materials are in a weight ratio between about 2:1 and about 1:2, especially between about 3:2 and 2:3, more especially between 10:9 and 9:10, that is, essentially 1:1. Although higher and lower ratios may be used, they merely approach the family wherein poly(1,2-butadiene) alone is present or the family wherein carboxy-terminated poly(1,2-butadiene) alone is present. It is preferred to have minor amounts of epoxy-group containing material present in this family. Thus, a preferred resin of the "mixed" family may contain:

50–90% 1:2 to 2:1 weight ratio mixture of poly(1,2-butadiene) and carboxy-terminated poly(1,2-butadiene);
7–40% vinyl monomer;
2–15% epoxy-group containing material;
1–10% free radical generating curing agent.

More preferably, this material will contain:

60–80% about 1:1 weight ratio poly(1,2-butadiene) and carboxy-terminated poly(1,2-butadiene);
15–30% styrene or substituted styrene monomer;
3–12% liquid epoxy-group containing material the amount chosen to provide about 1 epoxy for each carboxy in the carboxy-terminated butadiene;
2–6% free radical generating curing agent.

These compositions may also contain from 0.01 to 1% of an epoxy accelerator. One even more preferred resin of this "mixed" family contains:

67–73% about 1:1 weight ratio poly(1,2-butadiene) and carboxy-terminated poly(1,2-butadiene) especially B-1000 and C-1000;
19–23% t-butyl styrene;
2–5% dicumyl peroxide;
5.0–6.5% 3,4-epoxycyclohexylmethyl-3,4-epoxycyclohexylcarboxylate (said amount being chosen to provide an about 1:1 epoxy:carboxy mole ratio.

It may as well advantageously contain 0.15 to 0.25% epoxy accelerators, especially AMC®-2.

Another even more preferred resin of this family contains:

65–71% about 1:1 weight ratio poly(1,2-butadiene) and carboxy-terminated poly(1,2-butadiene) especially B-1000 and C-1000;
18–22% t-butyl styrene;
2–5% dicumyl peroxide;
8–10% 4,4'-isopropylidene dicyclohexanol (glycidyl derivative), said amount providing a 1:1 epoxy:carboxy ratio.

Yet another even more preferred resin contains:

68–74% about 1:1 weight ratio poly(1,2-butadiene) and carboxy-terminated poly(1,2-butadiene) especially B-1000 and C-1000;
19–24% t-butyl styrene;
2–5% dicumyl peroxide;
3–5% triglycidyl p-aminophenol, said amount providing a 1:1 epoxy:carboxy ratio.

In the family where the poly(1,2-butadiene) is all carboxy-terminated, this material may comprise:

50–90% carboxy-terminated poly(1,2-butadiene);
4–25% vinyl monomer;
5–30% epoxy group-containing material;
1–5% free radical generating curing agent.

More preferably, resins of this family will contain about one mole of epoxy for each mole of carboxy.
More preferred resins of this family contain the following:

60–80% carboxy-terminated poly(1,2-butadiene);
7–15% styrene or substituted styrene;
2–6% organo peroxy curing agent;
6–28% epoxy group-containing material so as to provide about 1 mole of epoxy per mole of carboxy.

Even more preferred resins of this family have t-butyl styrene as vinyl monomer and dicumyl peroxide as curing agent and C-1000 (or equivalent) as carboxy-terminated poly(1,2-butadiene).
Yet more preferred resins have the following compositions:

65–71% carboxy-terminated poly(1,2-butadiene)
9–12% t-butyl styrene;
2–4% dicumyl peroxide;
18–21% 4,4'isopropylidene dicyclohexanol glycidyl derivative.

74–80% carboxy-terminated poly(1,2-butadiene);
10–13% t-butyl styrene;
2–4% dicumyl peroxide;
7.5–10% Triglycidyl-p aminophenol.

65–71% carboxy-terminated poly(1,2-butadiene);
9–11% t-butyl styrene;
2–4% dicumyl peroxide;
4.5–6% diglycidyl derivative of substituted hydrocarbon;
14.5–17% diglycidyl ester of linoleic dimer acid.

64–69% carboxyl-terminated poly(1,2-butadiene);
9.5–10.5% t-butyl styrene;
2–4% dicumyl peroxide;
3.5–4.1% triglycidyl-p-aminophenol;
14.5–17.5% diglycidyl ester of linoleic dimer acid.

In each of these yet more preferred resins, the epoxy to carboxy ratio is essentially 1:1.

Composite Fabrication and Cure

The composites are made by filament winding techniques, wherein the resin is applied to the filament before, during, or after winding. The cure cycle employed will depend upon the cure agents present in the resin mixture. Generally, a multihour cure at one or more elevated temperatures is employed. Typically, a 5–30 hour cure cycle at temperatures gradually increasing from room temperature to 150° C., or greater is employed. Faster acting catalysts and/or initiators could shorten this cure cycle but would have the disadvantage of giving a shorter pot life resin.

Characterization of the Resin-Fiber Composite

The resin-fiber composites are characterized (a) by being filament-wound, (b) by having comparatively very high amounts of fibers in their cured state in the case of aramids greater than 65%, preferably greater than 70% and more preferably greater than 72% of fibers, (c) by being high strength—a good measure of this strength is to fabricate a "standard burst bottle" and determine the pressure at which it bursts. This test is detailed in the Examples, (d) by being low density, (e) by having a low water absorption at ambient conditions, and (f) by having a large resin shrinkage during cure. This last characteristic is exemplified by volume shrinkage on the order of about 6 to 12% during cure. This last property is unexpected in view of the excellent strength properties observed because in the prior art resin composites, it appears that the shrinkage and the resultant constriction produce a very lead to a decrease in strength, something not observed herein in filament wound composites.

The following Examples are provided merely to illustrate the invention. It will be noted that Examples 2–7 exemplify the formulation of resins but not composites. Following Example 7, the preparation and testing of fiber-resin composites are illustrated. They are not to be construed as limiting the invention's scope which is instead defined by the appended claims.

EXAMPLE 1

This Example demonstrates a carboxy-terminated poly(1,2-butadiene) resin. Into a polypropylene container equipped with a stirrer was placed 2700 gm of C1000 carboxy-terminated poly(1,2-butadiene). This was heated to 120°–130° F. and 756 gm of Shell Eponex® Resin DRH 151 (4,4'-isopropylidene cyclohexanol-epichlorohydrin resin) (mole ratio, epoxy:carboxy=1:1) and a solution of 108 gm of dicumyl peroxide (dicup) in 405 gm of t-butyl styrene (tBS) was added with stirring but without further heating. The solution of dicumyl peroxide was prepared just prior to its use by stirring the tBS at room temperature until the dicup went into solution. Stirring of the resin was continued until a homogeneous mixture was obtained. The bottom and sides of the mixing vessel were checked to insure that all the high-viscosity poly(butadiene) was in solution. The resin may then be stored in suitable containers and refrigerated. The viscosity of the resin as measured by a Brookfield viscometer was 1700 centipoises at 108° F.

This resin was tested in a Kevlar-49 aramid fiber filament-wound composite. In was applied and cured under nitrogen in a standard cure cycle of R.T→175° F., 1 hr; 175° F., 4 hr; 175° F.→200° F., 1 hr; 220° F., 2 hr; 220° F.→250° F., 1 hr; 250° F., 2 hr; 250° F.→285° F., 1 hr; and 285° F., 3 hr. The cured neat resin following the above cure schedule had a density of 1.0 g/cc. It absorbed 0.53% wt water after 24 days at 60° C. and 95% humidity. At lower temperatures even less water would be picked up.

EXAMPLE 2

This Example also demonstrates a carboxy-terminated poly(1,2-butadiene) based resin. The poly(1,2-butadiene) used was prepared by the reaction of a hydroxy end-capped poly(1,2-butadiene) (no. avg. M.W. 2000+200 D) with maleic anhydride to yield the half ester of maleic acid and a free carboxyl group at the poly(butadiene) chain ends.

Into a polypropylene container fitted with a stirrer was placed 2000 gm of this carboxyl-terminated poly(1,2-butadiene). In a similar fashion to Example 2, there was added 1500 gm of t-butyl styrene, 80 gm of dicumyl peroxide, and 194 gm of Bakelite ® epoxy resin ERL 4221 (3,4-epoxycyclohexylmethyl-3,4-epoxycyclohexylcarboxylate). The viscosity of the resulting resin was 620 centipoises at 23° C. as measured with a Brookfield viscometer. The resin should be refrigerated if not to be used immediately. A cured composite made from this resin following the cure of Example 1 exhibited a resin density of 1.0 gm/cc.

EXAMPLE 3

This Example demonstrates a poly(1,2-butadiene) type resin. In a polypropylene container equipped with a stirrer was placed 1000 gm of B1000 and 1600 gm of B2000 poly(1,2-butadiene) resins. A solution of 104 gm of dicumyl peroxide in 1105 gm of t-butyl styrene and 195 gm of tetraethyleneglycol dimethacrylate flexibilizing monomer was then added while stirring. Mixing was continued until a homogeneous solution is obtained which has a viscosity of 340 centipoises at 22° C. The resin may be stored in suitable containers and can be refrigerated for extended periods prior to use. This resin was cured as shown in Example 1 and also following addition of 1% of a paste of 55% benzoyl peroxide (LUPERCO ® ANS) immediately prior to curing. This resin was tested in a Kevlar-49 aramid fiber filament wound composite. It was applied (23.2% w, basis finished composite) and cured according to the schedule used in Example 1. Neat resin cured in this fashion had a density of 0.98 gm/cm$^3$. It absorbed 0.23% wt. water after 24 days at 60° C. and 95% humidity.

EXAMPLE 4

This Example demonstrates another poly(1,2-butadiene) type resin. In a similar fashion to Example 3, a resin was prepared which contained 2000 gm of B3000, poly(1,2-butadiene) resin (no. avg. M.W. 3000±300) and 1000 gm to t-butyl styrene, and 80 gm of dicumyl peroxide. The viscosity of this resin was 1200 cps at 19.5° C. as measured with a Brookfield viscometer. This resin had a density of 0.96 gm/cm$^3$ after cure.

EXAMPLE 5

The mixing of the resin and cure of Examples 1-4, was repeated using a different resin. 2000 Gm of a carboxy-terminated poly(1,2-butadiene) resin (no. avg. M.W. 2600) was used. This was prepared from a hydroxy-terminated poly(1,2-butadiene) resin (no. avg. M.W. 2000±200) by reaction with an excess of toluene diisocyanate (TDI) so that the poly(1,2-butadiene) chain was end-capped with an unreacted isocyanate group; the unreacted isocyanate groups being then reacted with hydroxyethyl methacrylate to yield a 1,2-polybutadiene chain end-capped with reactive methacrylate vinyl bonds. This material was mixed with 80 gm of dicumyl peroxide dissolved in 1500 gm of t-butyl styrene. The resultant mixed resin had a viscosity of 1800 cps at 20° C. and a density of 1.00 gm/cm$^3$ after cure.

EXAMPLE 6

This Example demonstrates a mixed type resin. In a similar fashion to the preparative procedures in the preceding Examples, 1350 gm of C1000 and 1350 gm of B1000 resins, 108 gm of dicup dissolved in 810 gm of t-butyl styrene and 216 gm of Bakelite ® Epoxy resin, ERL 4221, i.e., 3,4-epoxycyclohexylmethyl-3,4-epoxycyclohexane carboxylate, were mixed together to form a homogeneous solution. The resin formulation had a viscosity of 1600 cps at 20° C. and may be refrigerated for storage to insure extended shelf life. This material was tested as is and also with an epoxy accelerator, AMC ®-2 chromium octoate, (0.2%) being added just before curing.

EXAMPLE 7

This Example demonstrates another type of resin. The preparation and storage procedure was the same as in Example 6. This formulation contained 1430 gm of B1000 and 1430 of C1000 poly(butadiene) resins, 114 gm of dicumyl peroxide dissolved in 858 gm of tBS, and 163 gm of triglycidyl-p-aminophenol (mole ratio epoxy:carboxy=1:1). The mixed resin had a viscosity of 1750 cps at 22° C.

Resin Impregnation

In the filament winding of bottles, pressure vessels, and other structures, two general procedures are used to impregnate the fibers with the resin. The first procedure utilizes wet winding in which the fiber is run through a resin bath and then wound directly into the desired structure. The second procedure preimpregnates the fibers with resin. This preimpregnated fiber is then wound on spools and stored for winding into the finished structure at a future time. This prepreg procedure allows for somewhat greater control of the resin content in the prepreg and filament-wound structure. Each of the low density resins described in Examples 2-7 were cured and were also prepared into cured filament-wound composites with the properties shown in Table V. For comparison, a typical state-of-the-art filament wound epoxy resin composed of a diglycidylether of bis-phenol "A" and 1,4-butanediol diglycidylether cured with aromatic amines is presented as "A" in Table VI.

TABLE VI

| Material of Example | Fiber | Cured Resin Density g/cc | Water Pick-Up Max. % | % Fiber in Composite | % Volume Shrinkage of Resin During Cure |
|---|---|---|---|---|---|
| 2 | Kevlar-49 | 1.00 | — | 70% | — |
| 3 | " | 0.98 | 0.23 | 70 | 10.20 |
| 4 | " | 0.96 | — | 70 | — |
| 5 | " | 1.00 | — | 70 | — |
| 6 | " | 0.99 | 0.67 | 70 | 10.85 |

TABLE VI-continued

| Material of Example | Fiber | Cured Resin Density g/cc | Water Pick-Up Max. % | % Fiber in Composite | % Volume Shrinkage of Resin During Cure |
|---|---|---|---|---|---|
| 7 | " | 0.99 | 0.10 | 70 | 10.35 |
| A | " | 1.21 | 6.7 | 70 | 3.85 |

Testing of Filament Wound Structures

In order to test the effectiveness of a resin for filament winding certain standard structures can be fabricated. These include N.O.L. (Naval Ordnance Lab) rings, cylinders and pressure vessels. To test the low density resins, N.O.L. rings and pressure bottles were fabricated using both low density resins and baseline state-of-the-art epoxy resins and then burst pressure tested. The 5.75" I.D. diameter N.O.L. rings which were constructed demonstrated that the low density resins gave similar burst values to rings made with baseline epoxy resins. Unfortunately, the burst strength of the N.O.L. rings is mainly a fiber and less a resin dependent property, as the values obtained indicated.

A better comparison of resin effects was obtained with pressure bottles. Two types of bottles were constructed using the low density resins and prior art resins. These hemispherical domed cylindrical shaped bottles were filament wound with Kevlar-49 fiber on a rubber liner in a 4" diameter size and a 6.7" size. With the 6.7" diameter, 245 in³ bottle, the filaments were wound in a polar/circular wrap, with a 11°20" wrap angel, 3 polar layers and 4.5 hoop layers. The composite thickness was 0.111". This configuration is defined to be a Brunswick Corp. standard burst test bottle. The standard burst test is carried out by applying an internal hydrostatic pressure to bursting of such bottles made with low density resins. In this test, the bottles demonstrate failure in the cylindrical section thus displaying the composite strength in a biaxial stress mode.

Standard burst test results with an average of three 6.7" bottles prepared using resins as described in Examples 1, 3, 6 and 7 are shown in the following Table VII. Example "A" demonstrates the comparative result with a commonly used state-of-the-art epoxy resin. This epoxy resin is composed of the diglycidylether of bisphenol-A coreacted with nadicmethyl anhydride and catalyzed with benzyl dimethyl amine.

TABLE VII

| Example | Hydrostatic Burst Stress, psi | Resin Content, % | $\frac{pv^*}{w}$, in. $\times 10^6$ | Hoop Fiber Strength, Ksi |
|---|---|---|---|---|
| 1 | 5153 | — | — | 397 |
| 3 | 5297 | 23.2% | 1.33 | 408 |
| 6 | 5450 | 25.7% | 1.32 | 420 |
| 7 | 5500 | 21.2% | 1.41 | 424 |
| A | 4780 | 35.5% | 1.00 | 368 |

* $\frac{pv}{w}$ is a measure of performance, $\frac{\text{Bottle Burst Pressure} \times \text{Bottle Volume}}{\text{Bottle Composite Weight}}$ It will be appreciated that modifications can be made in the preparations shown in Examples 1–7. For example, Example 1 can be repeated using the following fibers in place of Kevlar-49:
"S" type fiber glass;
boron filaments;
carbon (graphite) filaments; or
organic fibers such as polybenzothiazole.

Examples 2, 3 or 6 and their related composite fabrications can be repeated, substituting styrene or vinyl toluene for some or all of the t-butyl stryene or replacing some of the t-butyl styrene with divinylbenzene.

What is claimed is:

1. A cured filament-wound composite comprising fibers and resin, said resin characterized when cured by a density of less than 1.05 g/cc, and by a saturation water pick-up of less than 1% by weight, and when uncured by comprising an aromatic vinyl hydrocarbon monomer and as its major component poly(1,2-butadiene), carboxy-terminated poly(1,2-butadiene) or mixtures thereof and by having a viscosity at 45° C. of less than 2000 cps.

2. The composite of claim 1 wherein said fibers are selected from among the group consisting of carbon (graphite) filaments, glass filaments, boron filaments and high modulus organic polymer filaments.

3. The composite of claim 1 wherein said fibers are aramid fibers.

4. The composite of claim 2 wherein said resin, in its uncured state, comprises from 50 to 90% by weight poly(1,2-butadiene), from 10 to 45% of aromatic vinyl hydrocarbon monomer and an effective curing amount in the range of from 1 to 10% of free radical generating curing agent.

5. The composite of claim 4 wherein said aromatic vinyl hydrocarbon monomer comprises a material selected from the group consisting of styrene and styrene substituted with up to two groups independently selected from alkyls and alkenyls of from 1 to 5 carbon atoms.

6. The composite of claim 5 additionally comprising from 1 to 10% by weight of a copolymerizable flexibilizing monomer.

7. The composite of claim 6 wherein said aromatic vinyl hydrocarbon monomer is t-butyl styrene and said curing agent comprises an organic peroxide.

8. The composite of claim 5 wherein said aromatic vinyl hydrocarbon monomer is t-butyl styrene and said curing agent comprises an organic peroxide.

9. The composite of claim 2 wherein said resin, in its uncured state, comprises from 60 to 80% by weight poly(1,2-butadiene), from 20 to 35% of aromatic vinyl hydrocarbon monomer selected from the group consisting of styrene and styrene substituted with up to two groups independently selected from alkyls and alkenyls of from 1 through 5 carbon atoms, from 3 to 10% of a copolymerizable flexibilizing monomer, and from 1 to 5% of an organic peroxide curing agent.

10. The composite of claim 9 wherein said flexibilizing monomer is a glycol dimethacrylate.

11. The composite of claim 10 wherein said aromatic vinyl hydrocarbon monomer is t-butyl styrene.

12. A cured filament-wound composite comprising fibers selected from among the group consisting of carbon filaments, glass filaments, boron filaments and high modulus organic polymer filaments and a resin characterized when cured by a density of less than 1.05 g/cc, and by a saturation water pick-up of less than 1% by weight, and when uncured by having a viscosity at 45° C. of less than 2000 cps, and by consisting essentially of from 63 to 68% by weight poly(1,2-butadiene) of average molecular weight between 1000 and 3300 daltons and of isomeric purity greater than 85%, from 26 to 30% t-butyl styrene, from 4 to 6% tetraethyleneglycol dimethacrylate, from 1 to 4% dicumyl peroxide and from 0.75 to 1.25% of dibenzoyl peroxide.

13. The composite of claim 12 wherein said fibers are aramid filaments in the amount of from 70 to 80% of the composite weight.

14. The composite of claim 2 wherein said resin, in its uncured state, comprises a mixture of poly(1,2-butadiene) and carboxy-terminated poly(1,2-butadiene).

15. The composite of claim 14 wherein said mixture is present in an amount of from 50 to 90% of the weight of said resin in its uncured state.

16. The composite of claim 15 wherein in said mixture poly(1,2-butadiene) and carboxy-terminated poly(1,2-butadiene) are in a weight ratio of from 1:2 to 2:1 inclusive.

17. The composite of claim 2 wherein said resin in its uncured state comprises from 50 to 90% by weight of a 1:2 to 2:1 weight ratio mixtures of poly(1,2-butadiene) and carboxy-terminated poly(1,2-butadiene), from 10 to 40% of aromatic vinyl hydrocarbon monomer, an effective curing amount in the range of from 1 to 10% of free radical-generating curing agent and from 2 to 15% of liquid epoxy group-containing material, the amount of said epoxy group-containing material being selected to provide about one epoxy for each carboxy present in said carboxy-terminated poly(1,2-butadiene).

18. The composite of claim 17 wherein said fibers are aramid fibers.

19. The composite of claim 17 wherein said aromatic vinyl hydrocarbon monomer is selected from the group consisting of styrene and styrene substituted with up to two groups independently selected from alkyls and alkenyls of from 1 through 5 carbon atom.

20. The composite of claim 19 wherein said aromatic vinyl hydrocarbon monomer is t-butyl styrene.

21. The composite of claim 2 wherein said resin in its uncured state comprises from 60 to 80% by weight of an about 1:1 weight ratio mixture of poly(1,2-butadiene) and carboxy-terminated poly(1,2-butadiene), from 15 to 30% of aromatic vinyl hydrocarbon monomer selected from the group consisting of styrene and styrene substituted with up to two groups independently selected from alkyls and alkenyls of from 1 through 5 carbon atoms, an effective curing amount in the range of from 2 to 6% of free radical-generating curing agent and from 3 to 12% of liquid epoxy group-containing material, the amount of said epoxy group-containing material being selected to provide about one epoxy for each carboxy present in said carboxy-terminated poly(1,2-butadiene).

22. The composite of claim 21 wherein said epoxy group-containing material is selected from the group consisting of liquid aromatic, aliphatic and cycloaliphatic di-, tri- and poly-epoxides.

23. The composite of claim 22 wherein said curing agent comprises an organic peroxide, said monomer comprises t-butyl styrene and said epoxy group containing material is selected from the group consisting of 1,4-butanediol diglycidyl ether, vinylcyclohexane dioxide, 3,4-epoxycyclohexylmethyl-3,4-epoxycyclohexane carboxylate, resorcinol diglycidyl ether, bis (3,4-epoxy-6-methylcyclohexyl-methyl) adipate, diglycidyl ether-bisphenol-A, diglycidyl ether of propylene glycol, triglycidyl ether of trimethylolpropane, triglycidyl ether of glycerine, diglycidyl ester of linoleic dimer acid, polyallylglycidyl ether, triglycidyl-p-aminophenol, diglycidyl hydantoin, epoxy novolac, and diglycidyl ether of methylene-bis-cyclohexanol.

24. The composite of claim 23 wherein the resin in its uncured state additionally comprises from 0.01 to 1% of an epoxy accelerator.

25. A cured filament wound composite comprising fibers selected from among the group consisting of carbon filaments, glass filaments, boron filaments and high modulus organic polymer filaments and a resin characterized when cured by a density of less than 1.05 g/cc, and by a saturation water pick-up of less than 1% by weight, and when uncured by having a viscosity at 45° C. of less than 2000 cps, and by consisting essentially of from 67 to 73% by weight of a 1:1 weight ratio mixture of poly(1,2-butadiene) of average molecular weight between 1000 and 3300 daltons and of isomeric purity greater than 85% and carboxy-terminated poly(1,2-butadiene) of molecular weight between 1000 and 3300 and of isomeric purity greater than 85%, from 19% to 23% t-butyl styrene, from 2 to 5% dicumyl peroxide and from 5.0–6.5% of 3,4-epoxycyclohexylmethyl-3,4-epoxycyclohexylcarboxylate.

26. The composite of claim 25 wherein said fibers are aramid filaments in the amount of from 70 to 80% of the composite weight.

27. The composite of claim 26 wherein said resin additionally consists essentially of from 0.15 to 0.25% by weight of chromium octoate.

28. A cured filament wound composite comprising fibers selected from among the group consisting of carbon filaments, glass filaments and high modulus organic polymer filaments and a resin characterized when cured by a density of less than 1.05 g/cc, and by a saturation water pick-up of less than 1% by weight, and, when uncured, by having a viscosity at 45° C. of less than 2000 cps, and by consisting essentially of from 65 to 71% by weight of 1:1 weight ratio mixture of poly(1,2-butadiene) of average molecular weight between 1000 and 3300 daltons and of isomeric purity greater than 85% and carboxy-terminated poly(1,2-butadiene) of molecular weight between 1000 and 3300 and of isomeric purity greater than 85%, from 18 to 22% t-butyl styrene, from 2 to 5% dicumyl peroxide and from 8 to 10% of 4,4'-isopropylidene dicyclohexanol (glycidyl derivative).

29. The composite of claim 28 wherein said fibers are aramid filaments in the amount of from 70 to 80% of the composite weight.

30. A cured filament wound composite comprising fibers selected from among the group consisting of carbon filaments, glass filaments, boron filaments and high modulus organic polymer filaments and a resin characterized when cured by a density of less than 1.05 g/cc, and by a saturation water pick-up of less than 1% by weight, and when uncured by having a viscosity at 45° C. of less than 2000 cps, and by consisting essentially of from 68 to 74% by weight of a 1:1 weight ratio mixture of poly(1,2-butadiene) of average molecular weight between 1000 and 3300 daltons and of isomeric purity greater than 85% and carboxy-terminated poly(1,2-butadiene) of molecular weight between 1000 and 3300 daltons and of isomeric purity greater than 85%, from 19 to 24% t-butyl styrene, from 2 to 5% dicumyl peroxide and from 3.5 to 5% by weight of trigylcidal p-aminophenol.

31. The composite of claim 30 wherein said fibers are aramid filaments in the amount of from 70 to 80% of the composite weight.

32. The composite of claim 2 wherein said resin, in its uncured state, comprises carboxy-terminated poly(1,2-butadiene).

33. The composite of claim 2 wherein said resin in its uncured state comprises from 50 to 90% by weight of carboxy-terminated poly(1,2-butadiene), from 5 to 25% of aromatic vinyl hydrocarbon monomer, an effective curing amount in the range of from 1 to 10% of free radical-generating curing agent and from 5 to 30% of liquid epoxy group-containing material, the amount of said epoxy group-containing material being selected to provide about one epoxy for each carboxy present in said carboxy-terminated poly(1,2-butadiene).

34. The composite of claim 33 wherein said aromatic vinyl hydrocarbon monomer is selected from the group consisting of styrene and styrene substituted with up to two groups independently selected from alkyls and alkenyls of from 1 through 5 carbon atoms.

35. The composite of claim 34 wherein said aromatic vinyl hydrocarbon monomer is t-butyl styrene.

36. The composite of claim 2 wherein said resin in its uncured state comprises from 60 to 80% by weight of carboxy-terminated poly(1,2-butadiene), from 7 to 15% of aromatic vinyl hydrocarbon monomer selected from the group consisting of styrene and styrene substituted with up to two groups independently selected from alkyls and alkenyls of from 1 through 5 carbon atoms, an effective curing amount in the range of from 2 to 6% of an organic peroxy curing agent and from 6 to 28% of liquid epoxy group-containing material, the amount of said epoxy group-containing material being selected to provide about one epoxy for each carboxy present in said carboxy-terminated poly(1,2-butadiene) and said epoxy group being selected from the group consisting of 1,4-butanediol diglycidyl ether, vinylcyclohexane dioxide, 3,4-epoxycyclohexylmethyl-3,4-epoxycyclohexane carboxylate, resorcinol diglycidyl ether, bis (3,4-epoxy-6-methylcyclohexyl-methyl) adipate, diglycidyl ether-bisphenol-A, diglycidyl ether of propylene glycol, triglycidyl ether of trimethylolpropane, triglycidyl ether of glycerine, diglycidyl ester of linoleic dimer acid, polyallylglycidyl ether, triglycidyl-p-aminophenol, diglycidyl hydantoin, epoxy novolac, and diglycidyl ether of methylene-biscyclohexanol.

37. The composite of claim 36 wherein said carboxy-terminated poly(1,2-butadiene) has an average molecular weight between 1000 and 3300 daltons and an isomeric purity of greater than 85%, said aromatic vinyl hydrocarbon monomer is t-butyl styrene, and said curing agent is dicumyl peroxide.

38. The composite of claim 37 wherein said resin consists of 65 to 71% by weight carboxy-terminated poly(1,2-butadiene), 9 to 12% t-butyl styrene, 2 to 4% dicumyl peroxide, and 18 to 21% 4,4'-isopropylidene dicyclohexanol glycidyl derivative.

39. The composite of claim 38 wherein said fibers are aramid filaments in the amount of from 70 to 80% of the composite weight.

40. The composite of claim 37 wherein said resin consists essentially of 74 to 80% by weight carboxy-terminated poly(1,2-butadiene), 10 to 13% t-butyl styrene, 2 to 4% dicumyl peroxide, and 7.5 to 10% triglycidyl-p-aminophenol.

41. The composite of claim 40 wherein said fibers are aramid filaments in the amount of from 70 to 80% of the composite weight.

42. The composite of claim 37 wherein said resin consists essentially of 65 to 71% by weight carboxy-terminated poly(1,2-butadiene), 9 to 11% t-butyl styrene, 2 to 4% dicumyl peroxide, 4.5 to 6% diglycidyl derivative of substituted hydrocarbon and 14.5 to 17.0% diglycidyl ester of linoleic dimer acid.

43. The composite of claim 42 wherein said fibers are aramid filaments in the amount of from 70 to 80% of the composite weight.

44. The composite of claim 37 wherein said resin consists essentially of 64 to 69% by weight carboxy-terminated poly(1,2-butadiene), 9.5 to 10.5% t-butyl styrene, 2 to 4% dicumyl peroxide, 3.5 to 4.1% triglycidyl-p-amino-phenol and 14.5 to 17.5% diglycidyl ester of linoleic dimer acid.

45. The composite of claim 44 wherein said fibers are aramid filaments in the amount of from 70 to 80% of the composite weight.

46. The composite of claim 3 embodied as a filament-wound rocket motor case.

47. The composite of claim 9 embodied as a filament-wound rocket motor case.

48. The composite of claim 17 embodied as a filament-wound rocket motor case.

49. The composite of claim 33 embodied as a filament-wound rocket motor case.

* * * * *